(12) United States Patent
Gu et al.

(10) Patent No.: US 7,639,251 B2
(45) Date of Patent: Dec. 29, 2009

(54) METHOD OF DISPLAYING 3-D AVATAR AND SYSTEM THEREOF

(75) Inventors: Sibin Gu, Shenzhen (CN); Lin Xia, Shenzhen (CN); Yan Jia, Shenzhen (CN); Huixing Wang, Shenzhen (CN); Xiao Fan, Shenzhen (CN); Li Li, Shenzhen (CN); Zhu Liang, Shenzhen (CN)

(73) Assignee: Tencent Technology (Shenzhen) Company Ltd., Shenzhen (CN)

( * ) Notice: Subject to any disclaimer, the term of this patent is extended or adjusted under 35 U.S.C. 154(b) by 0 days.

(21) Appl. No.: 12/147,318

(22) Filed: Jun. 26, 2008

(65) Prior Publication Data

US 2008/0284779 A1    Nov. 20, 2008

Related U.S. Application Data

(63) Continuation of application No. PCT/CN2006/003820, filed on Dec. 31, 2006.

(30) Foreign Application Priority Data

Dec. 31, 2005  (CN)  ............ 2005 1 0121495
Mar. 14, 2006  (CN)  ............ 2006 1 0034458
Mar. 27, 2006  (CN)  ............ 2006 1 0065926

(51) Int. Cl.
*G06T 15/00*    (2006.01)

(52) U.S. Cl. ............ 345/419; 345/473; 345/629; 463/40; 463/42; 709/204; 709/206; 715/706; 715/758; 715/850

(58) Field of Classification Search ............ 345/419, 345/473, 629; 463/40, 42; 715/706, 850; 709/206, 204
See application file for complete search history.

(56) References Cited

U.S. PATENT DOCUMENTS

2005/0137015 A1* 6/2005 Rogers et al. ............ 463/42
2005/0143174 A1* 6/2005 Goldman et al. ............ 463/42
2006/0075053 A1   4/2006 Xu et al. ............ 709/206

FOREIGN PATENT DOCUMENTS

| CN | 1450761 A  | 10/2003 |
| CN | 1453719 A  | 11/2003 |
| CN | 1209723 C  | 7/2005  |
| JP | 8235383 A  | 9/1996  |
| WO | WO01/80050 | 10/2001 |

OTHER PUBLICATIONS

International Search Report for Application No. PCT/CN2006/003820, dated Apr. 12, 2007.

* cited by examiner

*Primary Examiner*—Kimbinh T Nguyen
(74) *Attorney, Agent, or Firm*—Marshall, Gerstein & Borun LLP

(57) ABSTRACT

A method of displaying a 3-D avatar provided includes acquiring a 3-D avatar configuration file for a current user; acquiring at least one 3-D item suite indicated by the 3-D avatar configuration file; displaying the at least one 3-D item suite according to the 3-D avatar configuration file. An instant messaging client, a server and a system of displaying a 3-D avatar are also provided. With the above technical solutions, a 3-D avatar is displayed in an IM client, with which a user can exhibit different personal images by freely choosing different 3-D item suite.

25 Claims, 12 Drawing Sheets

The location where module interpenetration occurs

METHOD OF DISPLAYING 3-D AVATAR AND SYSTEM THEREOF

CROSS-REFERENCE TO RELATED APPLICATIONS

This is a continuation of International Application No. PCT/CN2006/003820, filed Dec. 31, 2006, which claims the priority benefit of Chinese Patent Application No. 200510121495.4, filed Dec. 31, 2005; Chinese Patent Application No. 200610034458.5, filed Mar. 14, 2006; and Chinese Patent Application No. 200610065926.4, filed Mar. 27, 2006, the entire respective disclosures of which are incorporated herein by reference.

FIELD OF THE INVENTION

The present invention relates to network communication, and particularly, to a method and system of displaying a 3-D avatar in an Instant Messaging (IM) client, an IM client and a server.

BACKGROUND OF THE INVENTION

With the development and popularization of the Internet, Instant Messaging has gradually become one of the most primary applications, and an Instant Messaging tool has become an important communication tool due to its tremendous advantage in real-time communication and simply performance.

The development of image displaying technologies causes a new chance for the Internet. Various fresh and lovely Avatars have appeared.

A word "Avatar" is originated from Indian Sanskrit and its original meaning is "bilocation or incarnation". The avatar has appeared widely in many hotspot network applications as standing for a virtual image since it was cited by a chat website in Korea named SayClub. The avatar satisfies user's demand for pursuing fashion. Specifically, the arbitrarily changeable sculpts and fancy fineries, as well as the novel props can exhibit a user's selfhood sufficiently in the network. Therefore, compared with a dull and expatiatory user ID, the avatar is a better image spokesman in the virtual world.

Combination with network communication makes the avatar really enter to various aspects of the network world, especially to a virtual image service, which is applied in an Instant Messaging tool and is a recreational communication value-added service. With the virtual image service a user can design a network virtual images, and costumes and scenarios thereof. Specifically, with the help of various virtual items such as fashionable fineries, trendy and fancy ornaments, beautiful and super-glaring background, and lovely and florid gifts, the user is able to perform operation on the avatar such as dressing up, plastic and other alternation. So the objects of exhibiting an avatar in the virtual word, prominent individualized dressing and obtaining realistic experience are attained.

Most of avatars in network communication, the representation of which includes the QQ show in the Instant Messaging tool QQ, are displayed in 2-Dimensionality, in which the format of corresponding images is GIF. A whole avatar is divided into two portions, fundamental personal model and accouterments. The fundamental personal model is divided into following components: head, trunk, arm, hand, leg, and foot. The avatar is made up from multiple images layer by layer. The sizes of the images are the same; the parts to be displayed of an image are adjusted to special areas while the other parts of the image are set transparent. An avatar server synthesizes the fundamental personal images and an accouterment image selected by the user, and sends the synthesized whole avatar to a network communication terminal. The synthesized image looks fancy and the size of the image fits to be transmitted under the existing network bandwidth condition. However, the spatial sense of the image is not strong and the animation representation is also limited. Therefore, the demand of interaction and representation for a high-end user cannot be satisfied.

Furthermore, the avatar of a user is static in the virtual chat mode, i.e. the avatar can not represent an action or voice corresponding to a symbol inputted in the chat block by the user. So the spatial sense of a 2-D avatar is not strong, the animation representation is also limited. Therefore, the demand of interaction and representation for a high-end user cannot be satisfied.

With the development of 3-D technologies, 3-D image which with finer quality and stronger spatial sense has been applied frequently. However, the finer quality a 3-D image has, the larger the 3-D image file is. In such a case, if the 3-D image is processed with the method of the 2-D image, the network delay would be intolerable to a user. So displaying a 3-D image in a terminal becomes difficulty. Therefore, the technology of providing a 3-D avatar for a network communication terminal under the existing bandwidth condition becomes the hot spot of the market.

SUMMARY OF THE INVENTION

The embodiments of the present invention provide a method of displaying a 3-D avatar, an instant messaging client, a server and a system of displaying a 3-D avatar.

The method of displaying a 3-D avatar provided includes:
acquiring a 3-D avatar configuration file for a current user;
acquiring at least one 3-D item suite indicated by the 3-D avatar configuration file;
displaying the at least one 3-D item suite according to the 3-D avatar configuration file.

The instant messaging client provided includes:
a first unit, adapted to store a 3-D avatar configuration file for a current user;
a second unit, adapted to store at least one 3-D item suite indicated by the 3-D avatar configuration file;
a third unit, connected to the first unit and the second unit, and adapted to acquire at least one 3-D item suite indicated by the 3-D avatar configuration file and display the at least one 3-D item suite.

The server provided includes:
a first unit, adapted to store a 3-D avatar configuration file and at least one 3-D item suite;
a second unit, connected to the first unit, adapted to send the 3-D avatar configuration file and the at least one 3-D item suite to an instant messaging client.

The system of displaying a 3-D avatar provided includes:
a server, adapted to provide a 3-D avatar configuration file and at least one 3-D item suite for an instant messaging client;
the instant messaging client, adapted to acquire the 3-D avatar configuration file and at least one 3-D item suite indicated by the 3-D avatar configuration file from the server, and display the at least one 3-D item suite according to the 3-D avatar configuration file.

With the above technical solutions, a 3-D avatar is displayed in an IM client, with which a user can exhibit different personal images by freely choosing different 3-D item suite.

EMBODIMENTS OF THE INVENTION

A detailed description of the embodiments is provided hereinafter with reference to the attached drawings.

Figure 3:
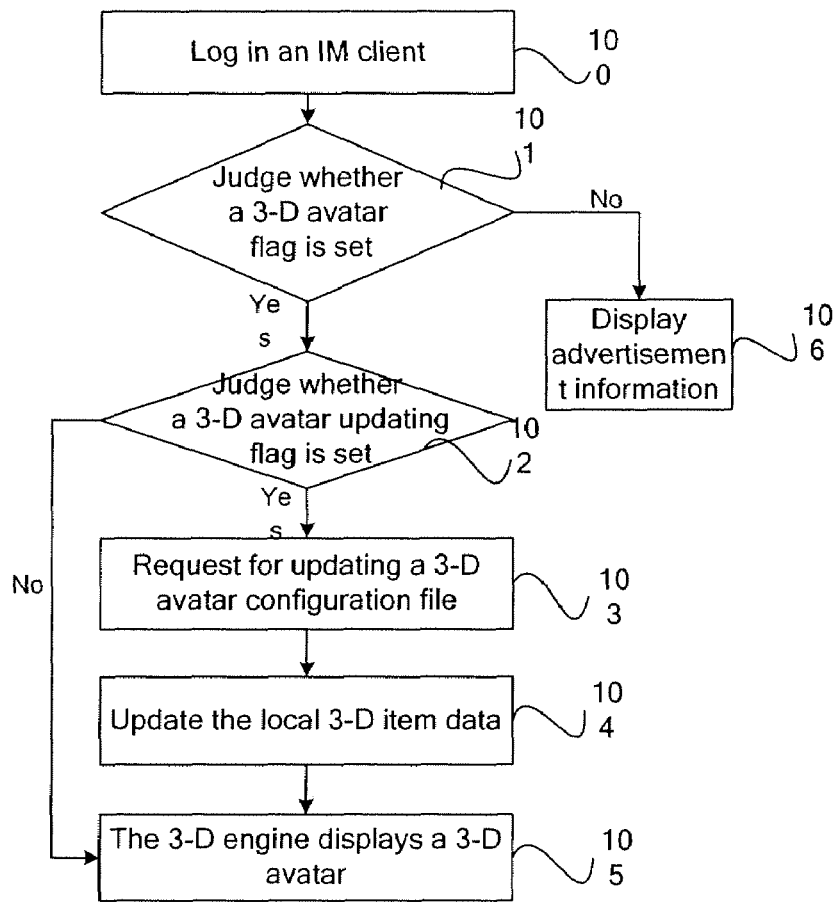
FIG. 3 shows a flow chart for displaying and updating a 3-D avatar in the method of displaying a 3-D avatar in accordance with an embodiment.

FIG. 3 shows a flow chart for displaying and updating a 3-D avatar in the method of displaying a 3-D avatar in accordance with an embodiment of the present application. Firstly, in Step 100, a user logs in an IM client. In Step 101, the IM client judges whether a 3-D avatar flag is set for a user. The flag is used for indicating whether the user has configured a 3-D avatar. If the flag is set for the user, it is indicated that the user has configured a 3-D avatar, and otherwise, it is indicated that the user has not configured a 3-D avatar. The user in Step 100 could be a user logging in and using the IM client or be a contact of the user logging in the IM client. When the 3-D avatar flag is not set for the user, the IM client proceeds to Step 106, e.g., displays advertisement information.

If the 3-D avatar flag is set for the user, then in Step 102, the IM client judges whether a 3-D avatar updating flag is set for the user. The 3-D avatar updating flag is set by the IM client based on the comparison result of the timestamp of the newest 3-D avatar and the timestamp of the local 3-D avatar when the user logs in the IM client, herein the timestamp of the newest 3-D avatar is acquired from a 3-D avatar backstage server. If the received timestamp of the newest 3-D avatar is newer than the timestamp of the local 3-D avatar, the 3-D avatar updating flag is set. If the 3-D avatar updating flag is not set for the user, it is indicated that the local 3-D avatar configuration file is the newest. In such a case, the IM client directly proceeds to Step 105, and displays the 3-D avatar of the user through an embedded 3-D engine. If the 3-D avatar updating flag is set for the user, it is indicated that the local 3-D avatar configuration file is to be updated. In such a case, proceed to Step 103, request the 3-D avatar backstage server for the newest 3-D avatar configuration file, and replace the local 3-D avatar configuration file with the newest 3-D avatar configuration file. In Step 104, update a 3-D item suite stored locally.

Each 3-D avatar module (each 3-D item suite) is identified by a serial number. The IM client compares the timestamp of a local 3-D avatar module with the timestamp of a newest 3-D avatar module in the newest 3-D avatar configuration file, which has the same serial number with the local 3-D avatar module. If the timestamp of the local 3-D avatar module is newer, it is indicated that the local 3-D avatar module needs not to be updated, and thus the IM client continues to make the above comparison for a next 3-D avatar module. If the timestamp of the newest 3-D avatar module in the newest 3-D avatar configuration file is newer, it is indicated that the local 3-D item suite needs to be updated. In such a case, the IM client requests the 3-D avatar backstage server for the newest 3-D avatar module with the same serial number, and replaces the local 3-D avatar module with the received newest 3-D avatar module.

Finally, in Step 105, the IM client displays the 3-D avatar of the user by invoking the embedded 3-D engine.

Specifically, the IM client sends the 3-D avatar configuration file to a 3-D displaying engine; the 3-D displaying engine displays the at least one 3-D item suite based on the 3-D avatar configuration file. When the 3-D avatar updating flag is not set, the 3-D displaying engine displays the at least one 3-D avatar module stored locally. When the 3-D avatar updating flag is set, the 3-D displaying engine displays the at least one 3-D avatar module downloaded newly from the backstage server and then stored locally.

A serial number which used for identifying a 3-D avatar module in the embodiment is contained in the 3-D item list in the 3-D avatar configuration file. The format of the 3-D avatar configuration file may be XML, in which the item list of an avatar is described. Based on the set updating flag and the item list, the IM client such as a QQ Client acquires at least one 3-D item suite file via a 3-D avatar backstage server such as a UDP File Server, stores the at least one 3-D item suite file in the local special directory, and sends the 3-D avatar configuration file with the XML format to the 3-D displaying engine embedded in the QQ Client. Based on the contents of the 3-D avatar configuration file acquired from the local special directory, the 3-D displaying engine acquires the at least one 3-D item suite, i.e., a 3-D avatar module, and displays the at least one 3-D item suite. A 3-D avatar includes a personal image, personal action, pet image, pet action and background foreground.

User A logs in an IM client. When the IM client determines that a 3-D avatar flag is set for User A, it requests the 3-D avatar backstage server for the timestamp of the newest 3-D avatar of User A. After receiving the requested timestamp of the newest 3-D avatar of User A, the IM client compares it with the timestamp of the local 3-D avatar of User A. If the timestamp of the local 3-D avatar is newer, do not set a 3-D avatar updating flag.

The M client determines that the 3-D avatar flag is set from logging information of the user logging in the IM client currently. It can be seen that the 3-D avatar flag is contained in the user logging information.

The IM client also performs the above judgment for a contact of User A after User A logging in the IM client. The IM client determines that the 3-D avatar flag is not set for a contact of User A, called User B. Thus, the IM client henceforth displays advertisement information wherever the 3-D avatar of User B should be displayed.

When the IM client determines that the 3-D avatar flag is set for a contact of User A, called User C, it requests the 3-D avatar backstage server for the timestamp of the newest 3-D avatar of User C. After receiving the requested timestamp of the newest 3-D avatar of User C, the IM client compares it with the timestamp of the local 3-D avatar of User C. When determining that the received timestamp of the newest 3-D avatar is newer, the IM client sets a 3-D avatar updating flag for User C.

The IM client determines that 3-D avatar flags are set for User B and User C respectively according to the online friend information and user information of User A who logs in currently, or according to all friend information acquired by User A who logs in currently when re-running the register guide.

When a user uses an IM tool to communicate, the interfaces on which a 3-D avatar is displayed mainly includes a user details panel, a user friend panel TIP pop window, a friend online notification floating window, and a chat window TIP pop window. When an operation needs to display the above panel or window, the IM client needs to display the 3-D avatar on the panel or window.

The 3-D avatars of User A and User B are displayed when User A opens a chat window and sends a message to User B. The IM client determines that the 3-D avatar flag is set but the 3-D avatar updating flag is not set for User A, and thus determines that the 3-D avatar of User A is not to be updated and then directly invokes the embedded 3-D engine to display the 3-D avatar of User A.

Meanwhile, the IM client determines that the 3-D avatar flag is not set for User B, and thus displays advertisement information.

The IM client needs to display the 3-D avatar of User C when User A looks over the user details panel of User C. When the IM client determines that the 3-D avatar flag and the 3-D avatar updating flag are both set for User C, it requests the 3-D avatar backstage server for the newest 3-D avatar configuration file of User C and replaces the local 3-D avatar configuration file with the received newest 3-D avatar configuration file. The IM client compares the timestamp of a 3-D avatar module in the received newest 3-D avatar configuration file of User C with the timestamp of the local 3-D avatar module which has the same serial number with the 3-D avatar module in the received newest 3-D avatar configuration file. When the IM client determines that the timestamp of the local 3-D avatar module with serial number 1 is newer, it continues to perform the above comparison for the 3-D avatar module with serial number 2. If the timestamp of the 3-D avatar module with serial number 2 in the newest 3-D avatar configuration file of User C is newer, the IM client requests the 3-D avatar backstage server for the newest 3-D avatar module with serial number 2, and replaces the local 3-D avatar module with serial number 2 with the received newest 3-D avatar module with serial number 2.

After updating all of the local 3-D avatar modules which need to be updated for User C, the IM client invokes the embedded 3-D engine to display the 3-D avatar of User C.

In various cases, such as opening a chat window or looking over the user details panel of User C described above, the displayed 3-D avatar has been updated, i.e. the displayed 3-D avatar also could be obtained after the user clicks a refresh button.

In the above cases, the 3-D avatar of User A or of a contract of User A can be displayed without updated. After User A logging in the IM client, the IM client needs to display the 3-D avatar of User A or of a contract of User A when User A performing an operation such as opening a chat window, looking over a user details panel, or the contact of User A logging in. In such cases, the IM client judges whether a 3-D avatar flag is set for User A or the contact of User A respectively. If the 3-D avatar flag is set for User A or the contact of User A, the IM client sends the local avatar configuration file to the 3-D displaying engine to display the corresponding at least one 3-D item suite. The avatar configuration file and the at least one 3-D item suite may be stored locally after the 3-D avatar design page is designed, or may be updated from the server last time.

The embodiment of statically displaying a 3-D avatar is described above. The embodiment of dynamically displaying a 3-D network avatar, i.e. triggering a 3-D avatar to represent a corresponding action and voice based on action/expression request information sent by a user, will be described as follows.

Figure 4:
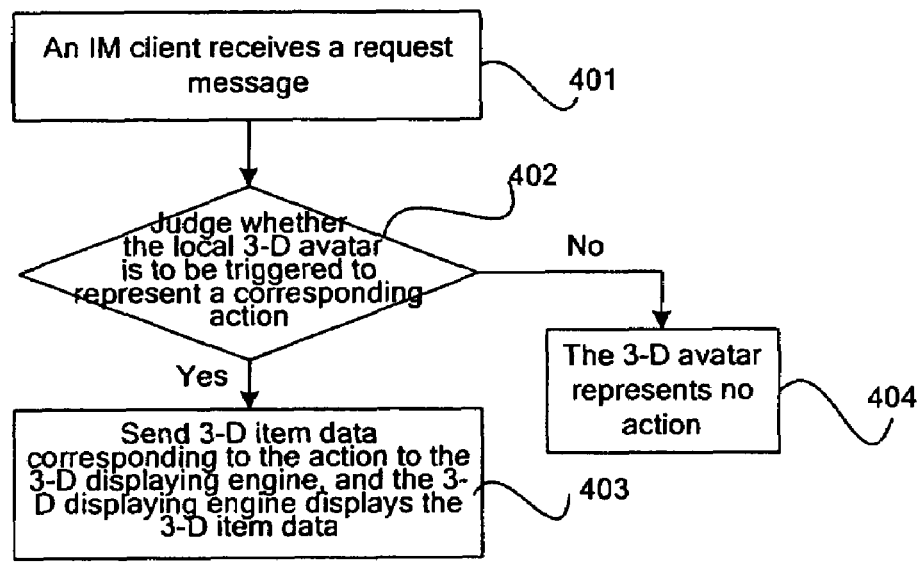
FIG. 4 shows a flow chart of the method of displaying a 3-D network avatar dynamically in accordance with an embodiment.

FIG. 4 shows a flow chart of the method of displaying a 3-D network avatar dynamically in accordance with an embodiment. The method includes the following steps.

Step 401: the IM client receives an action/expression request message, and the request message includes an action/expression request message sent or received by a user.

Step 402: judge whether the request message can trigger the local 3-D avatar to represent a corresponding action; if the request message can trigger the local 3-D avatar to represent a corresponding action, proceed to Step 403; and otherwise, proceed to Step 404.

Step 403: a 3-D item suite corresponding to the action is sent to the 3-D displaying engine embedded in the IM client, and the 3-D displaying engine displays the 3-D item suite.

Step 404: the 3-D avatar represents no action.

In the above description, before the 3-D item suite corresponding to the action is sent to the 3-D displaying engine embedded in the IM client, the 3-D item suite corresponding to the action may be acquired from a server.

The flow of triggering a 3-D avatar to represent a corresponding action by expression/action information inputted by a user or an expression/action button clicked is hereinafter described.

Figure 5:
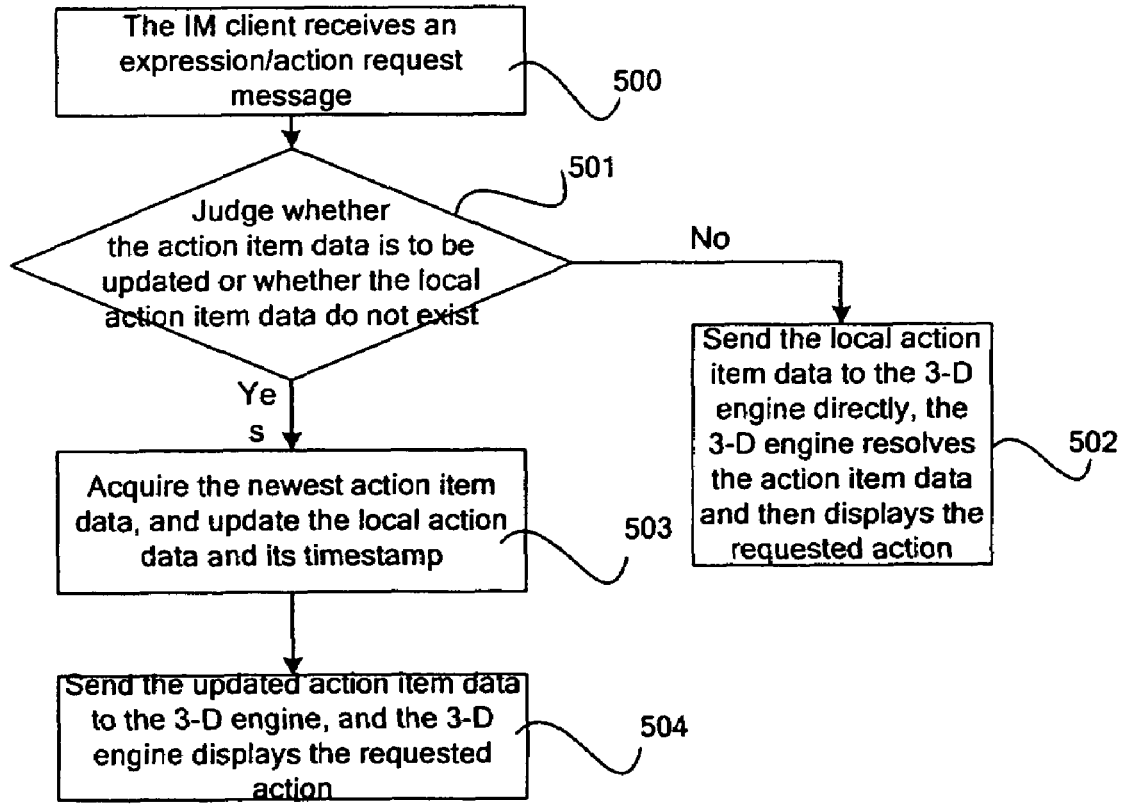
FIG. 5 shows a flow chart for triggering a 3-D avatar to represent a corresponding action when a user clicking an expression/action button in accordance with an embodiment.

FIG. 5 shows a flow chart for triggering a 3-D avatar to represent a corresponding action when a user clicking an expression/action button in accordance with an embodiment. As shown in FIG. 5, in Step 500, a user opens a chat window, and inputs information in the chat window, such as inputting the symbol ":)", the word "laugh" or other figures. There is a common default expression/action configuration file in all of IM clients. The format of the common default expression/ action configuration file also can be the XML, and the common default expression/action configuration file contains an action item list.

A user may also purchase an action item for an avatar in the network marketplace. Then, a button generated automatically for triggering the purchased action item is stored in the common default expression/action configuration file stored in the client. So the user can see the action item in the client. Likewise, the 3-D avatar configuration file contains an action item list.

In this step, when the user inputs text information or clicks the action/expression button to send a request message, the IM client captures the expression/action information of the user, and determines that the local 3-D avatar is to be triggered to represent a corresponding action by the request message.

In Step 501, judge whether action item suite corresponding to the action needs to be updated or whether the action item suite corresponding to the action exists locally. If there is the action item suite but the newest timestamp and the local timestamp of the action item suite are different, or the action item suite does not exist locally, the action item suite is re-acquired from the backstage server, and the action item suite and its timestamp stored locally are updated (in Step 503). The updated action item suite is then sent to the 3-D engine to represent the action requested by the user (in Step 504). Otherwise, the action item suite corresponding to the action is directly sent to the 3-D engine, and the 3-D engine resolves the action item suite and displays the action requested by the user (in Step 502).

In Step 500, when the user inputs text information such as ":)" or "laugh", the IM client acquires the action item suite corresponding to the common default expression/action configuration file from the 3-D backstage server and stores the action item suite locally. The IM client acquires locally the 3-D avatar configuration file to be displayed and the action item suite. The 3-D displaying engine displays the action item suite according to the 3-D avatar configuration file.

A 3-D avatar is generally triggered to represent a corresponding action in the following two methods during the user chatting.

In the first method, some user actions captured by the IM client, such as sending or receiving a symbol of smiling face, can trigger the 3-D avatar to represent a corresponding action. Since all of users have a common default expression/action configuration file with the XML format, when the terminal (IM client) software captures a user action which can trigger the 3-D avatar to represent a corresponding action, the action item suite file corresponding to the common default expression/action configuration file is acquired via the server and sent to the 3-D engine. The 3-D engine makes the 3-D avatar of the user represent the corresponding action.

In the second method, the user updates a 3-D action item such as purchasing the 3-D action item in the 3-D show network marketplace, and then stores the updated 3-D action item in the client. Since when the user stores his newest avatar, a 3-D avatar configuration file with the XML format is generated automatically; based on the contents of the 3-D avatar configuration file with the XML format, the terminal (IM client) software automatically generates a button for triggering the purchased action item. The avatar is triggered to represent an action when the user clicks the button of the action item during a chat.

Specifically, the above 3-D avatar display may be applied when the user logs in the IM client such as QQ and opens a chat window. The 3-D avatars of both the user and the contact on the chatting may be displayed in the window. When the user clicks the refresh button of itself or the contract, the newest 3-D avatar of itself or the contract can be seen. Meanwhile, during the chatting, when the user clicks an action/expression button or inputs text information "laugh" or ":)", the 3-D avatar represents the corresponding action and voice by using the above two method. That is, after the related steps in FIG. 3 are performed, the related steps in FIG. 5 are performed.

Figure 6:
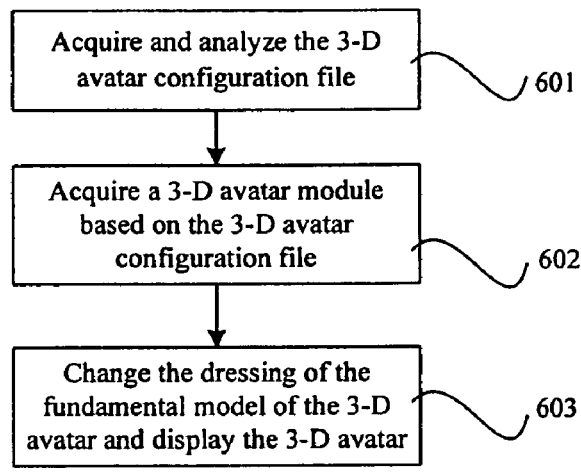
FIG. 6 shows a flow chart for a 3-D engine displaying a 3-D avatar in accordance with an embodiment.

An embodiment provides a method of the 3-D displaying engine displaying the 3-D avatar. FIG. 6 shows a flow chart for the 3-D engine displaying the 3-D avatar. After the 3-D engine in the IM client is initialized, in Step 601, the 3-D engine acquires and analyzes the 3-D avatar configuration file of the user. In Step 602, the 3-D engine acquires a 3-D avatar module based on the 3-D avatar configuration file. In Step 603, the 3-D engine changes the dressing of the fundamental model of the 3-D avatar based on the acquired 3-D avatar module, i.e., synthesizes the 3-D avatar with the acquired 3-D avatar module corresponding to each component of the fundamental model, and displays the 3-D avatar.

In steps 601 and 602, the 3-D displaying engine analyzes the contents of the 3-D item list in the 3-D avatar configuration file with the XML format, and acquires the 3-D item suite from the local special directory based on the 3-D item list.

The above process of changing the dressing of the fundamental model of the 3-D avatar and displaying the 3-D avatar includes following steps: The IM client of the network communication terminal divides the fundamental model into components and attaches location information to each component. The 3-D avatar server sets an identifier for each 3-D avatar module. The network communication terminal binds the 3-D avatar modules to the components respectively based on the location information attached to each component. Finally, the IM client adjusts the posture of the components based on the identifiers and displays the 3-D avatar. The 3-D avatar includes a personal image, personal action, pet image, pet action, background and foreground. Therefore, the fundamental model also includes a fundamental personal model, fundamental personal action model, fundamental pet model, fundamental pet action model, fundamental background model and fundamental foreground model.

The steps of changing and displaying the dressing of the personal fundamental model are hereinafter described as the example.

Firstly, the network communication terminal divides the personal fundamental model into components such as hair, head, trunk, arm, hand, leg, calf and foot, and attaches location information to each component, which indicates the location of the component in the personal fundamental model. The 3-D avatar server sets an identifier for each 3-D avatar module such as hairstyle, finery and shoes, and each identifier indicates the posture of the special component after being bound to the 3-D avatar module. The network communication terminal binds the 3-D avatar modules to the components respectively based the location information attached to each component and the contents of each 3-D avatar module, such as binding the hairstyle to the head, the finery to the trunk and the shoes to the foot. Finally, the IM client adjusts the posture of the components based on the identifiers, such as determining that the forearm in the arm component are not displayed based on the identifier if the upper body is bound to long-sleeved frock, and determining that the calf component is not displayed based on the identifier if the lower body is bound to trousers.

Figure 7:
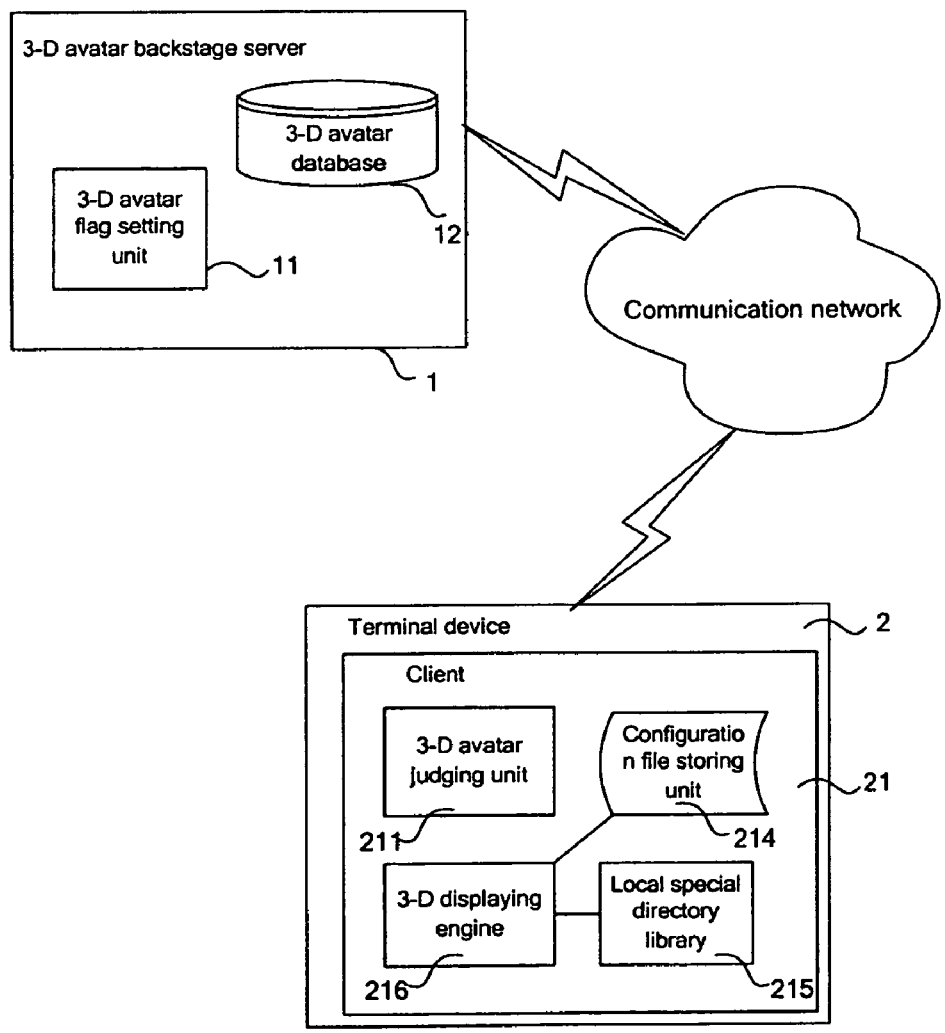
FIG. 7 shows a schematic diagram of a system of displaying a 3-D avatar in accordance with Embodiment 1.

The following embodiments provide a system of displaying a 3-D avatar. FIG. 7 shows a schematic diagram of a system of displaying a 3-D avatar in accordance with Embodiment 1. The system includes a 3-D avatar backstage server 1, adapted to provide a 3-D avatar configuration file and 3-D item suite and set a 3-D avatar flag, and an IM client located in a terminal device 2, connected to the 3-D avatar backstage server via network, adapted to set a 3-D avatar flag and display the 3-D avatar.

The 3-D avatar backstage server 1 includes:

a 3-D avatar flag setting unit 11, adapted to set a 3-D avatar flag in the logging information of the user logging in currently, online friend information and user information of the user logging in currently, or in all of friend information acquired by the user logging in currently when re-running the register guide;

a 3-D avatar database 12, adapted to store at least one 3-D item suite, the 3-D avatar configuration file and their respective timestamps.

The IM client 21 includes:

a 3-D avatar judging unit 211, and adapted to judge whether a 3-D avatar flag is set for the user;

a configuration file storing unit 214, adapted to store the 3-D avatar configuration file;

a local special directory database 215, adapted to store at least one 3-D item suite;

a 3-D displaying engine 216, connected to the 3-D avatar judging unit 211, the configuration file storing unit 214 and the local special directory library 215, and adapted to acquire the 3-D item suite from the local special directory library based on the 3-D avatar configuration file and display the 3-D item suite when the 3-D avatar judging unit 211 determining that the 3-D avatar flag is set for the user.

With the system of displaying provided by Embodiment 1, it can judge whether a user sets the 3-D avatar, and display the 3-D avatar of the user in the IM client. The 3-D avatar judging unit may not be set in the IM client, i.e. it is taken as default that each user logging in the IM client has set a 3-D avatar.

Figure 8:
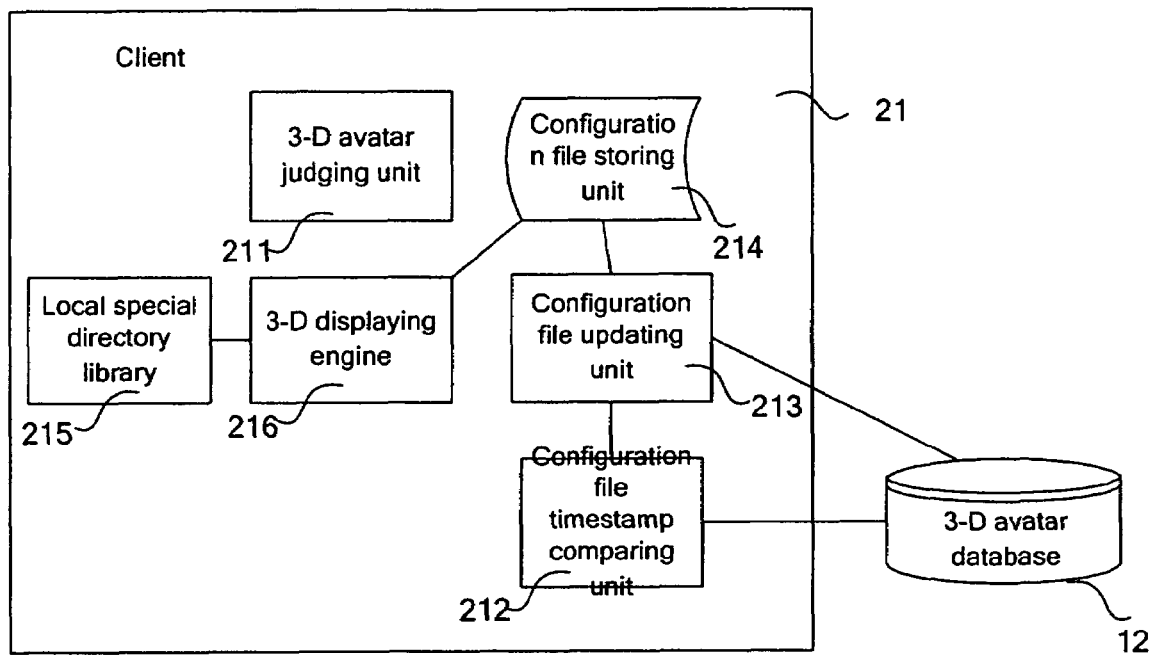
FIG. 8 shows a schematic diagram of a system of displaying a 3-D avatar in accordance with Embodiment 2.

FIG. 8 shows a schematic diagram of a system of displaying a 3-D avatar in accordance with Embodiment 2.

Base on the system of display a 3-D avatar in Embodiment 1, the IM client further includes:

a configuration file timestamp comparing unit 212, connected to the 3-D avatar database 12 via network, and adapted to compare the timestamp of the newest 3-D avatar configuration file in the 3-D avatar database with the timestamp of the local 3-D avatar configuration file;

a configuration file updating unit 213, connected to the configuration file timestamp comparing unit 212 and the configuration file storing unit 214, and adapted to request the 3-D avatar database 12 of the 3-D avatar backstage server 1 for downloading the newest 3-D avatar configuration file based on the comparison result of the configuration file timestamp comparing unit 212 and store the downloaded 3-D avatar configuration file in the configuration file storing unit 214.

In Embodiment 2, the 3-D avatar configuration file is updated for the user logging in the IM client.

Figure 9:
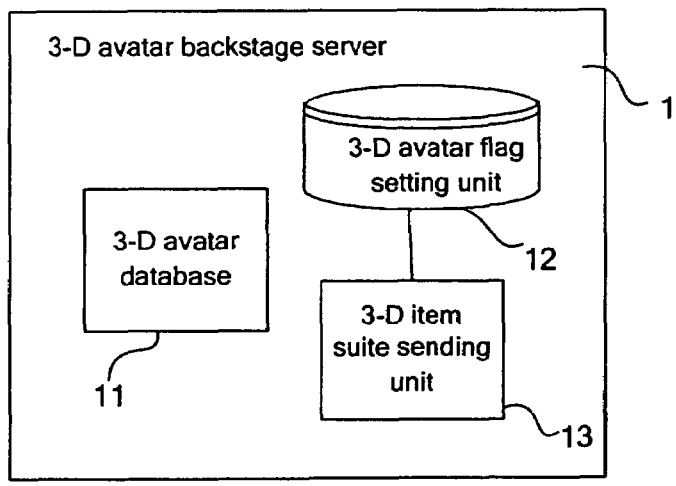
FIG. 9 shows a schematic diagram of a system of displaying a 3-D avatar in accordance with Embodiment 3.

FIG. 9 shows a schematic diagram of a system of displaying a 3-D avatar in accordance with Embodiment 3. Base on the system of display a 3-D avatar in Embodiment 2, the 3-D avatar backstage server 1 further includes:

a 3-D item suite sending unit 13, connected to the 3-D avatar database 12, and adapted to send the 3-D item suite based on a 3-D item suite request message.

Figure 10:
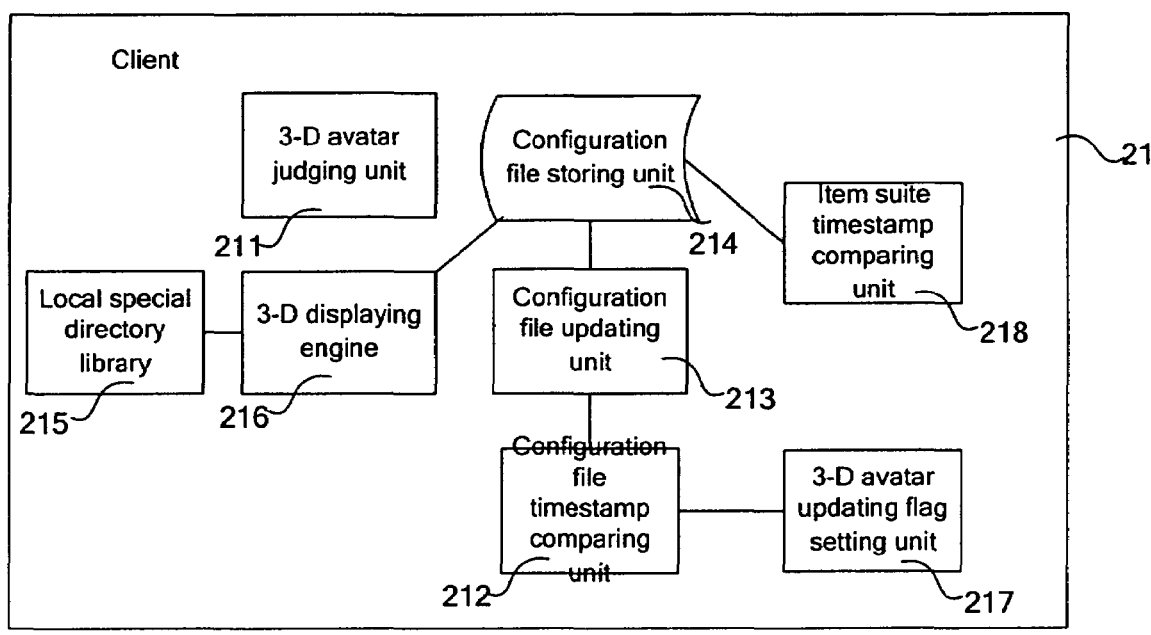
FIG. 10 shows a schematic diagram of a system of displaying a 3-D avatar in accordance with Embodiment 4.

FIG. 10 shows a schematic diagram of a system of displaying a 3-D avatar in accordance with Embodiment 3. Base on the system of display a 3-D avatar in Embodiment 2, the IM client 21 in the terminal device further includes:

an item suite timestamp comparing unit 219, connected to the configuration file storing unit 214, and adapted to compare a first timestamp of the 3-D item suite corresponding to the 3-D item suite list in the newest 3-D avatar configuration file with a second timestamp of the 3-D item suite in the local special directory library;

a 3-D avatar updating flag setting unit 217, connected to the configuration file timestamp comparing unit 212, and adapted to set the 3-D avatar updating flag for the current user based on the comparison result of the configuration file timestamp comparing unit 212.

In Embodiment 4, the 3-D avatar updating flag is set for a user, which enables the user to acquire the newest 3-D avatar of it or a contract based on 3-D avatar updating flag after the user clicks a refresh button.

Figure 11:
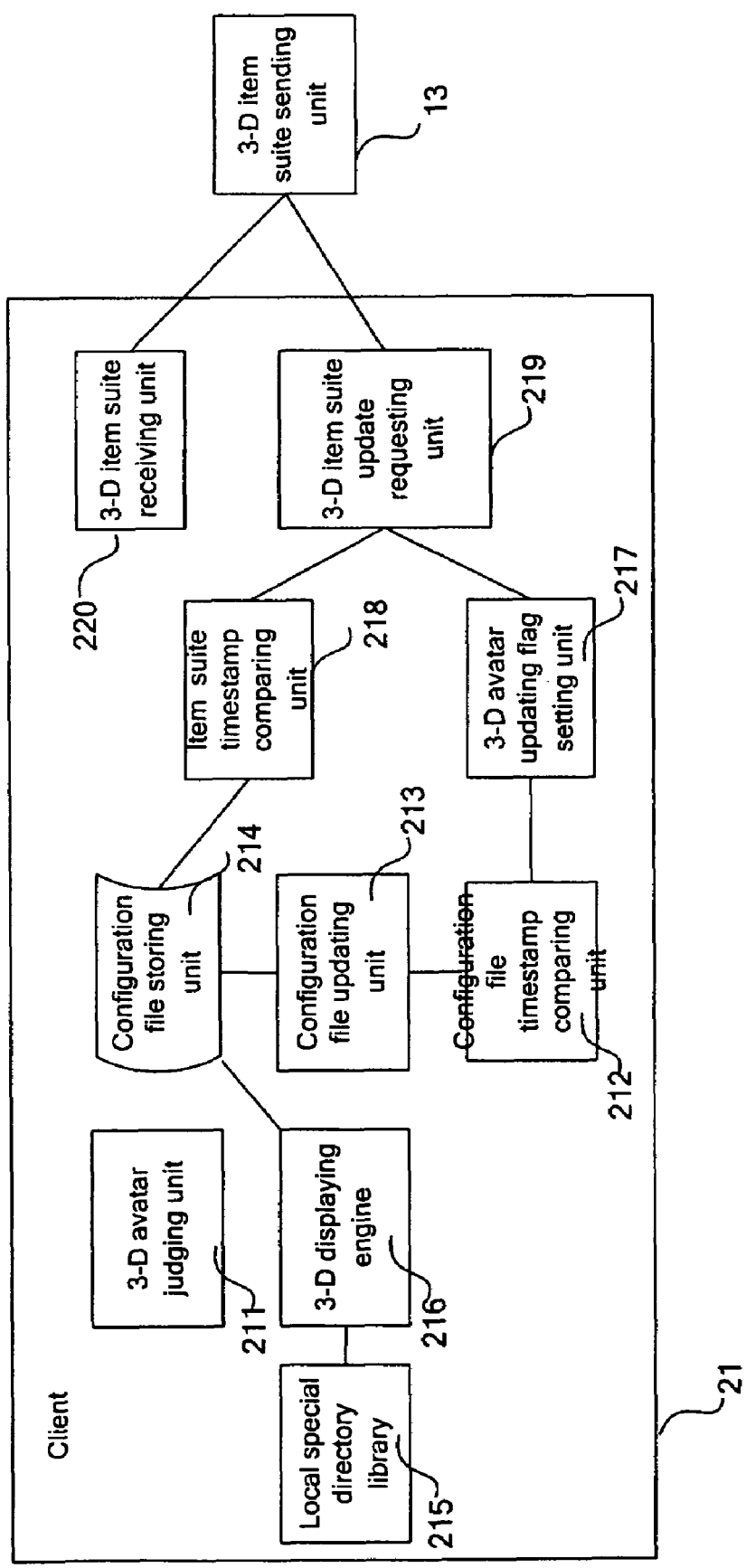
FIG. 11 shows a schematic diagram of a system of displaying a 3-D avatar in accordance with Embodiment 5.

FIG. 11 shows a schematic diagram of a system of displaying a 3-D avatar in accordance with Embodiment 5. Base on the system of display a 3-D avatar in Embodiment 4, the IM client 21 further includes:

a 3-D item suite update requesting unit 219, connected to the item suite timestamp comparing unit 218, the 3-D avatar updating flag setting unit 217 and the 3-D item suite sending unit 13, and adapted to initiate the 3-D item suite request based on the 3-D avatar updating flag and the comparison result of the item suite timestamp comparing unit 218;

a 3-D item suite receiving unit 220, connected to the 3-D item suite sending unit 13, and adapted to receive the 3-D item suite and store the 3-D item suite in the local special directory library 215.

In Embodiment 5, the updated 3-D avatar is displayed in various cases such as the user opening a chat window or a user looking over the user details panel of User C.

Figure 12:
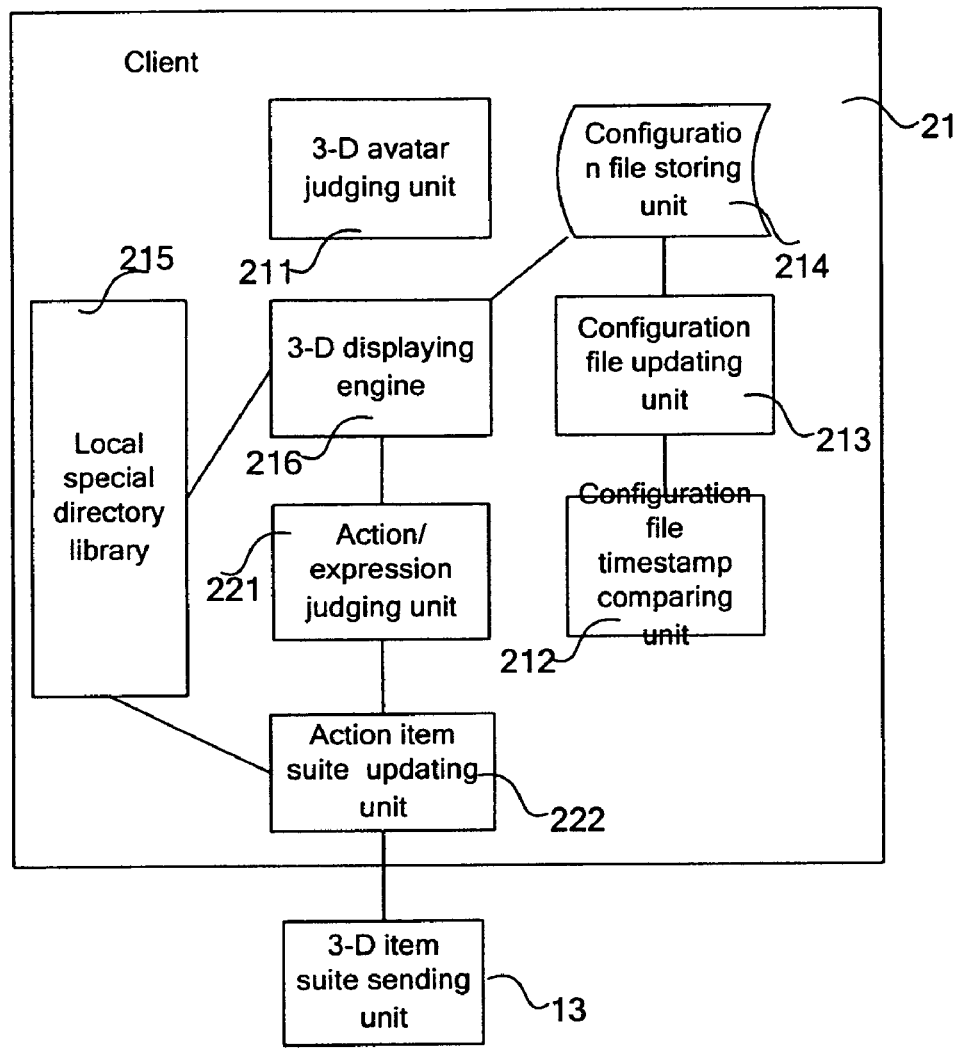
FIG. 12 shows a schematic diagram of a system of displaying a 3-D avatar in accordance with Embodiment 6.

FIG. 12 shows a schematic diagram of a system of displaying a 3-D avatar in accordance with Embodiment 6. Base on the system of display a 3-D avatar in Embodiment 2, the IM client further includes an action/expression judging unit 221, connected to the 3-D displaying engine 216, and adapted to judge whether an action/expression request message is to trigger the local 3-D avatar to represent a corresponding action and notify the 3-D displaying engine 216 to display the corresponding action. The action/expression judging unit 221 also can be added in the system of Embodiment 5, and the connection relationship between the action/expression judging unit 221 and another unit is same as that in Embodiment 6.

The IM client further includes an action item suite updating unit 222, connected to the action/expression judging unit 221, the 3-D item suite sending unit 13 and the local special directory library 215, and adapted to analyze the action/expression request message, receive an action item suite corresponding to the action/expression request message from the 3-D item suite sending unit 13, and store the action item suite in the local special directory library 215.

When the action item suite updating unit 222 analyzes that the action/expression request message includes text information, it acquires the action item suite corresponding to the common default expression/action configuration file via the 3-D avatar backstage server 1 and stores the action item suite locally. When the action/expression request message includes action button information, the IM client judges whether the action item suite is to be updated or whether the action item suite exist locally. If the action item suite is to be updated or the action item suite does not exist locally, the IM client acquires the newest action item suite from the 3-D avatar backstage server 1 and updates the action item suite stored locally and its timestamp; and otherwise, the IM client does not update action item suite stored locally.

The action item suite updating unit 222 also can be added in the system of Embodiment 5, and the connection relationship between the action item suite updating unit 222 and another unit is same as that in Embodiment 6.

In Embodiment 6, the IM client captures the expression/action information of the user when the user inputs text information or clicks an action/expression button, determines that the inputted expression/action information is to trigger the local 3-D avatar to represent a corresponding action, and displays the local 3-D avatar representing the corresponding action. For example, when a user clicks a action/expression button or inputs text information "laugh" or ":)" to send the action/expression request message, the action/expression judging unit 221 determines that the 3-D avatar is to represent the corresponding action, and the action item suite updating unit 222 downloads the corresponding action item suite from the 3-D avatar server 1 based on the type of the action/expression request and the common default expression/action configuration file, and the 3-D displaying engine 216 displays the corresponding action.

Figure 13:
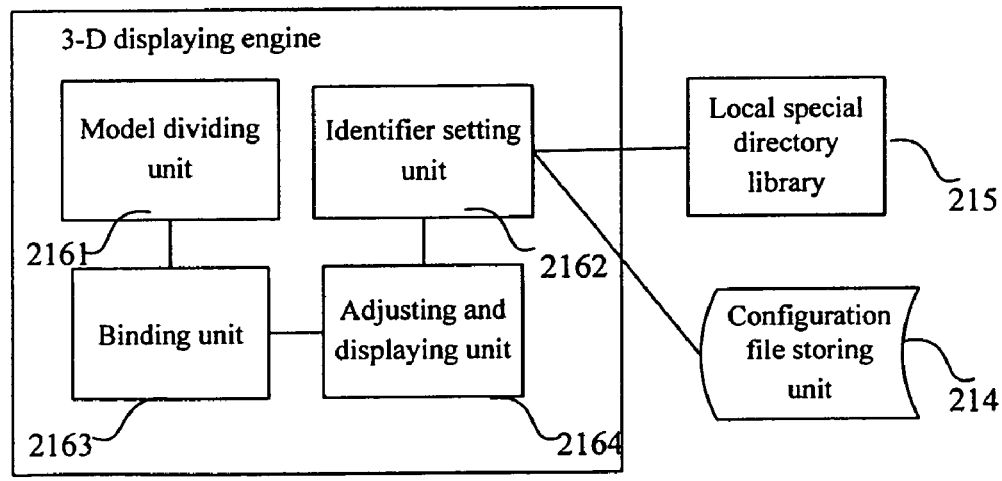
FIG. 13 shows a schematic diagram of a system of displaying a 3-D avatar in accordance with Embodiment 7.

FIG. 13 shows a schematic diagram of a system of displaying a 3-D avatar in accordance with Embodiment 7. The 3-D displaying engine 216 includes:

a model dividing unit 2161, adapted to divide fundamental model of the 3-D avatar into components and attach location information to each component;

a identifier setting unit 2162, connected to the configuration file storing unit 214 and the local special directory library 215, and adapted to set an identifier for each 3-D avatar module;

a binding unit 2163, connected to the model dividing unit 2161, and adapted to bind the 3-D avatar module to the component based on the location information attached to each component;

an adjusting and displaying unit 2164, connected to the identifier setting unit 2162 and the binding unit 2163, and adapted to adjust the posture of the component based on the identifier and display the 3-D avatar.

In the embodiments of the system of display a 3-D avatar as shown in FIGS. 12-18, the problem in the prior art that only 2-D avatar can be displayed in the IM client is solved, and luxuriant representation of the avatar is provided. Moreover, luxuriant IM interaction is supported by representing a corresponding action and voice according to an expression symbol in chat information, and better interaction and representation of a high-end user is achieved.

Figure 1A:
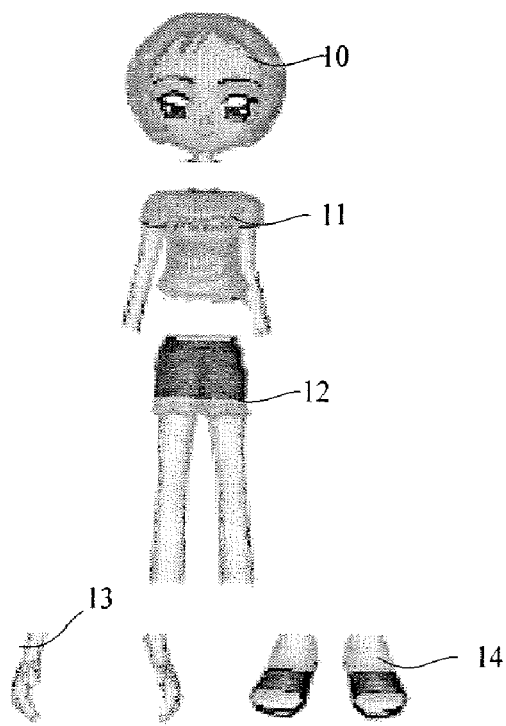
FIG. 1A shows a schematic diagram for dividing a personal model.
Figure 1B:
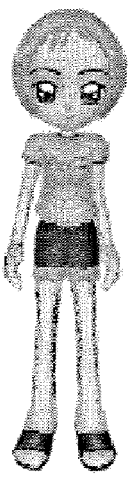
FIG. 1B shows a schematic diagram of a 3-D avatar.

FIG. 1A shows a schematic diagram for dividing a personal model. As shown in FIG. 1A, the whole personal model of the 3-D avatar is divided into 5 components: head 10, upper body 11, lower body 12, hand 13 and foot 14. The different finery modules corresponding to the 5 components are generated respectively and then stored to form at least one module library. When an avatar is displayed, the finery modules are selected from the at least one module library based on the finery of the avatar, and the avatar is synthesized. The avatar synthesized with the finery modules corresponding to the 5 components is shown in FIG. 1B.

Figure 2:
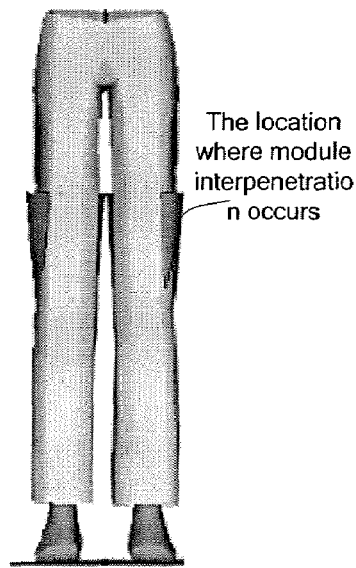
FIG. 2 shows a schematic diagram of module interpenetration when displaying an avatar with finery modules of top-boot and trousers.

When an avatar with finery modules of top-boot and trousers is displayed, i.e. the finery module of the lower body 12 is trousers, and the finery module of the foot model is top-boot, as shown FIG. 2, module interpenetration occurs at the location between the upper of the top-boot finery module and the trousers finery module due to the difference in shape. It can be seen from FIG. 2 that because of the module interpenetration between finery modules, the displaying effect of the avatar is affected badly.

Likewise, when an avatar with finery modules of gantlets and long-sleeved frock is displayed, module interpenetration between the finery module of the hand 13 and the finery module of the upper body 11 occurs.

Figure 14:
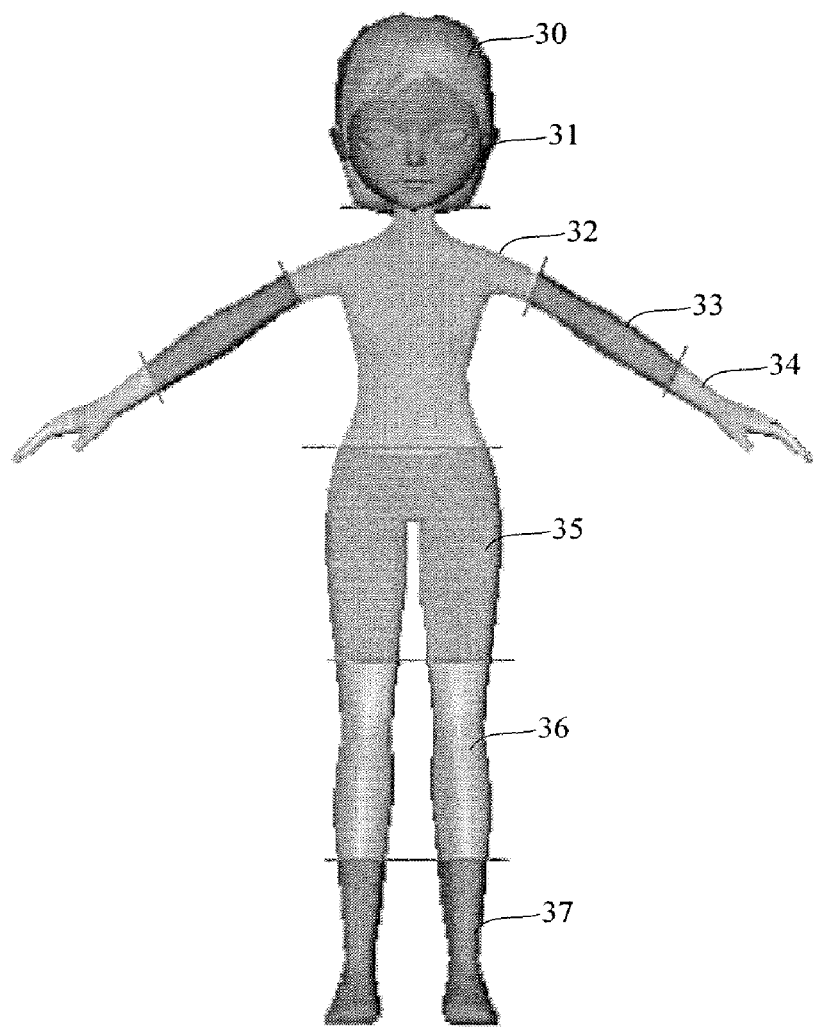
FIG. 14 shows a schematic diagram for dividing a personal model in the method of representing a 3-D avatar in accordance with an embodiment.

FIG. 14 shows a schematic diagram for dividing a personal model in the method of representing a 3-D avatar in accordance with an embodiment. As shown in FIG. 14, a personal model is divided into 8 components, a hair model 30, a head model 31, an upper body model 32, an arm model 33, a hand model 34, a lower body model 35, a calf model 36, and a foot model 37. Dividing head into the head model and the hair model can make it flexible and convenient to change the dressing of the personal model.

In the dividing method shown in FIG. 14, the arm model 33 locates between the location of the shoulder in the upper body model 32 and the location of the forearm in the hand model 34. Preferably, the shoulder terminates at the location of the cuff when the finery module of the upper body model is short-sleeved. The lower body model 35 terminates at the location of the upper knee, while the lower body model 35 terminates at the location of the ankle in FIG. 1. And the calf model 36 locates between the locations of the upper knee and the foot. Preferably, the foot model 37 is below the location slightly above the ankle.

After a personal model is divided into 8 components, different finery modules for the 8 components are established and stored respectively based on the demand of changing the dressing of a personal model. The method of storing and acquiring the finery modules is the same as the embodiment in FIG. 1A.

Figure 15:
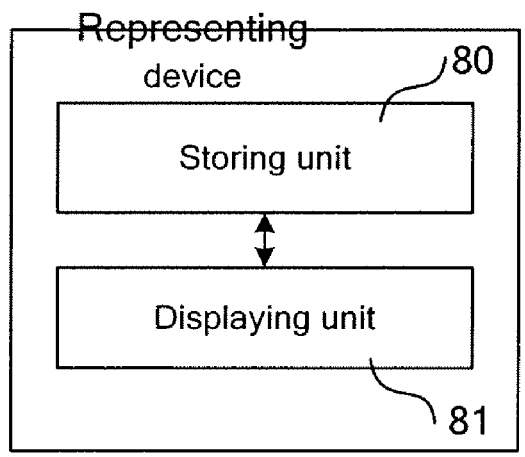
FIG. 15 shows a schematic diagram of a device of representing a 3-D avatar in accordance with an embodiment.

FIG. 15 shows a schematic diagram of a device of representing a 3-D avatar in accordance with an embodiment. As shown in FIG. 15, the device of representing a 3-D avatar includes a storing unit 80 and a displaying unit 81. The storing unit 80 is used for storing various finery modules corresponding to the 8 components into which a personal model is divided. The displaying unit 81 is used for acquiring the finery modules corresponding to each component from the storing unit 80 and synthesizing the 3-D avatar with the acquired finery modules, and hiding the finery module corresponding to the calf model and/or the finery module corresponding to the arm model when module interpenetration occurs at the location of the calf model and/or the location of the arm model in the synthesized avatar.

Figure 16:
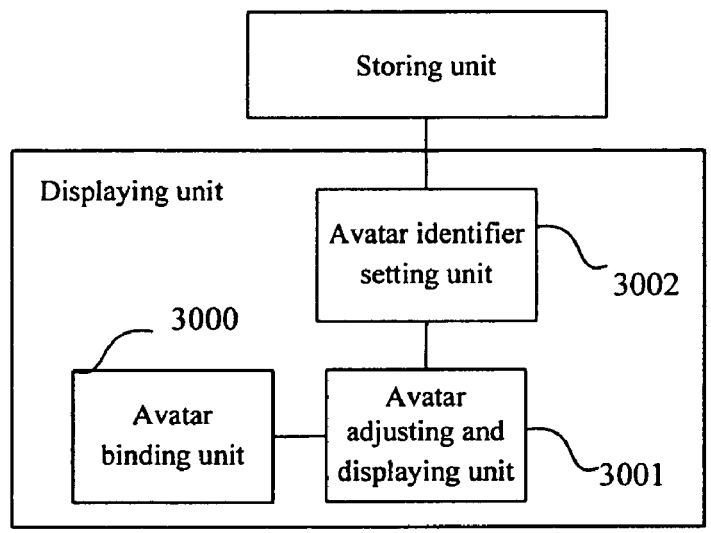
FIG. 16 shows a schematic diagram of a displaying unit of the device of representing a 3-D avatar in accordance with an embodiment.

FIG. 16 shows a schematic diagram of a displaying unit of the device of representing a 3-D avatar in accordance with an embodiment. As shown in FIG. 16, the displaying unit includes: an avatar identifier setting unit 3002, adapted to set an identifier for each component of the personal model; an avatar binding unit 3000, connected to the storing unit, and adapted to bind a finery module to a component of the personal model based on the location information of the component of the personal model and the finery module; an avatar adjusting and displaying unit 3001, connected to the avatar binding unit 3000 and the avatar identifier setting unit 3002, adapted to hide the finery module corresponding to the calf model and/or the finery module corresponding to the arm model when module interpenetration occurs at the location of the calf model and/or the location of the arm model in a synthesized avatar, and adjust the posture of each component of the personal model based on each identifier and display the avatar. When the avatar binding unit binds a component of the personal model to a finery module, such as binding the upper body model to a trousers finery module, or binding the foot model to a top-boot finery module, module interpenetration may occur at the location of the calf model. In such a case, the avatar adjusting and displaying unit sets the display property of the top-boot finery module at the location of the calf model invisible. Thus the problem of module interpenetration is avoided and better display effect is achieved.

Those skilled in the art should know that in a modified embodiment, the displaying unit may be divided into a judging unit and a display implementing unit. However, the function and effect of the two units are substantially same as those of the displaying unit 81.

Figure 17:
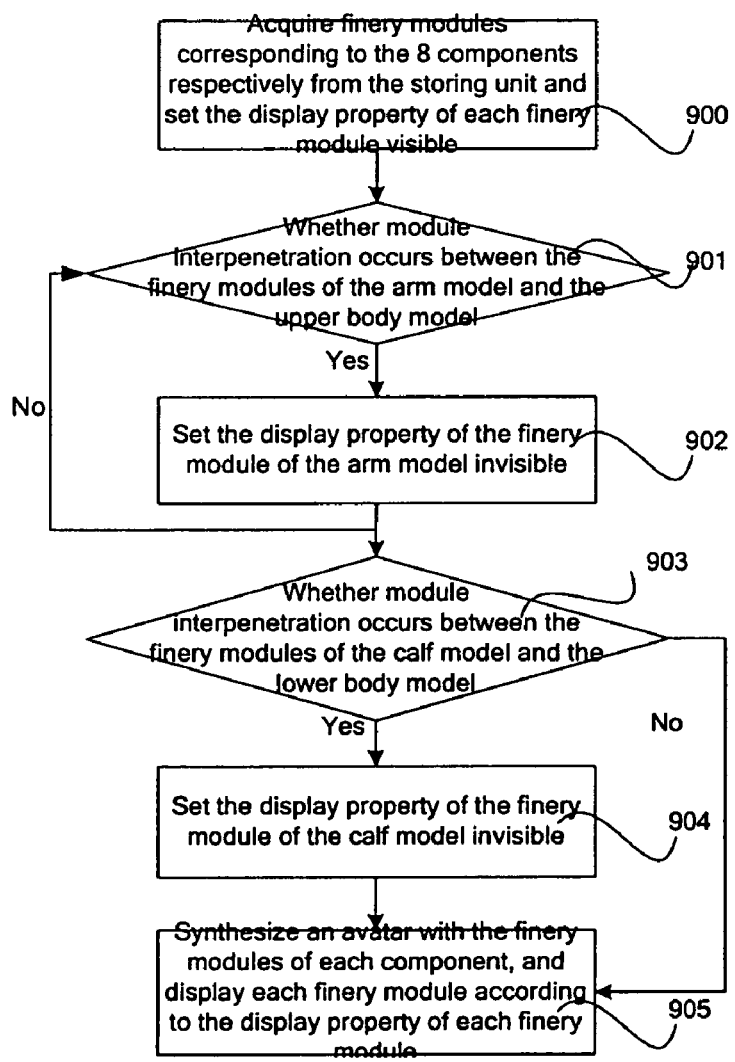
FIG. 17 shows a flow chart of the method of representing a 3-D avatar in accordance with an embodiment.

FIG. 17 shows a flow chart of the method of representing a 3-D avatar in accordance with an embodiment. As shown in FIG. 17, in a method of representing a 3-D avatar, between the step of binding 3-D avatar modules to components respectively based on the location information attached to each component, and the step of adjusting the posture of the components and displaying the components, the method further includes:

In Step 900, based on the finery of the avatar, the displaying unit 81 acquires the finery modules (i.e. the 3-D avatar modules) corresponding to the 8 components respectively from the storing unit 80, and sets the display property of each finery module visible.

In Step 901, the displaying unit 81 judges whether module interpenetration occurs between the finery modules of the arm model 33 and the upper body model 32; proceed to Step 902 if module interpenetration occurs between the finery modules of the arm model 33 and the upper body model 32; and otherwise, proceed to Step 903.

In Step 902, set the display property of the finery module of the arm model 33 invisible.

In Step 903, the displaying unit 81 judges whether module interpenetration occurs between the finery modules of the calf model 36 and the lower body model 35; proceed to Step 904 if module interpenetration occurs between the finery modules of the calf model 36 and the lower body model 35; and otherwise, proceed to Step 905.

In Step 904, set the display property of the finery module of the calf model 36 invisible.

In Step 905, synthesize an avatar with the finery modules of each component, and display each finery module according to the display property of each finery module.

In the above steps, the step of judging whether module interpenetration occurs between the finery modules of the calf model 36 and the lower body model 35 can be performed before the step of judging whether module interpenetration occurs between the finery modules of the arm model 33 and the upper body model 32. The order of the steps does not affect the detailed implementation. Likewise, the judgments also can be performed between the steps of synthesizing and displaying.

Figure 18:
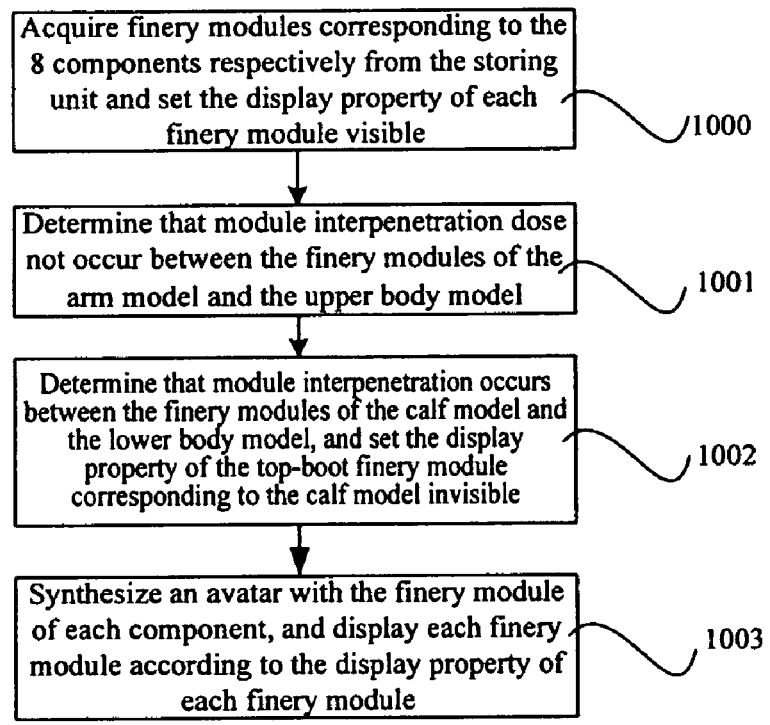
FIG. 18 shows a flow chart for displaying an avatar with finery modules of top-boot and trousers in lower part, and finery module of T-shirt in upper part.

FIG. 18 shows a flow chart for displaying an avatar with finery modules of top-boot and trousers in lower part, and finery module of T-shirt in upper part. As shown in FIG. 18, the process includes:

In Step 1000, the displaying unit 81 acquires the finery modules corresponding to the 8 components respectively from the storing unit 80, and sets the display property of each finery module visible. The finery module corresponding to the upper body model 32 is short-sleeved, the finery module corresponding to the lower body model 35 is trousers, and the finery module corresponding to the calf model 36 and the foot model 37 is top-boot.

In Step 1001, the displaying unit 81 determines that module interpenetration does not occur between the finery modules of the arm model 33 and the upper body model 32; and proceed to Step 1002.

In Step 1002, the displaying unit 81 determines that module interpenetration occurs between the finery modules of the calf model 36 and the lower body model 35, and sets the display property of the top-boot finery module corresponding to the calf model 36 invisible.

In Step 1003, synthesize an avatar with the finery modules corresponding to the 8 components, and display each finery module according to the display property of each finery module. Since the display property of the boot finery module corresponding to the calf model 36 is invisible, module interpenetration is avoided in the displayed avatar.

Figure 19:
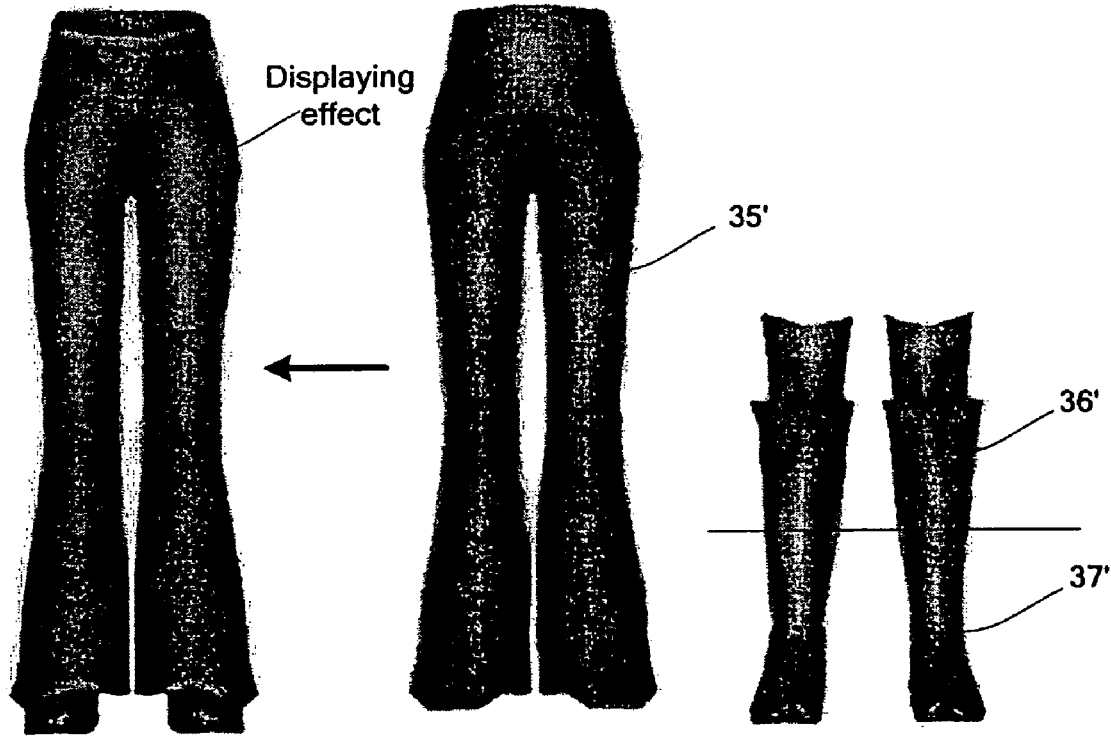
FIG. 19 shows a schematic diagram of a 3-D avatar in accordance with an embodiment.

The display effect is shown in FIG. 19. The top-boot finery module is composed of the finery module 36' corresponding to the calf model 36 and the finery module 37' corresponding to the foot model 37, and as shown in FIG. 19, the avatar is synthesized with the finery module of trousers 35' corresponding to the lower body model 35, the finery module 36' and the finery module 37', and herein the finery module 36' is hidden.

Figure 20:
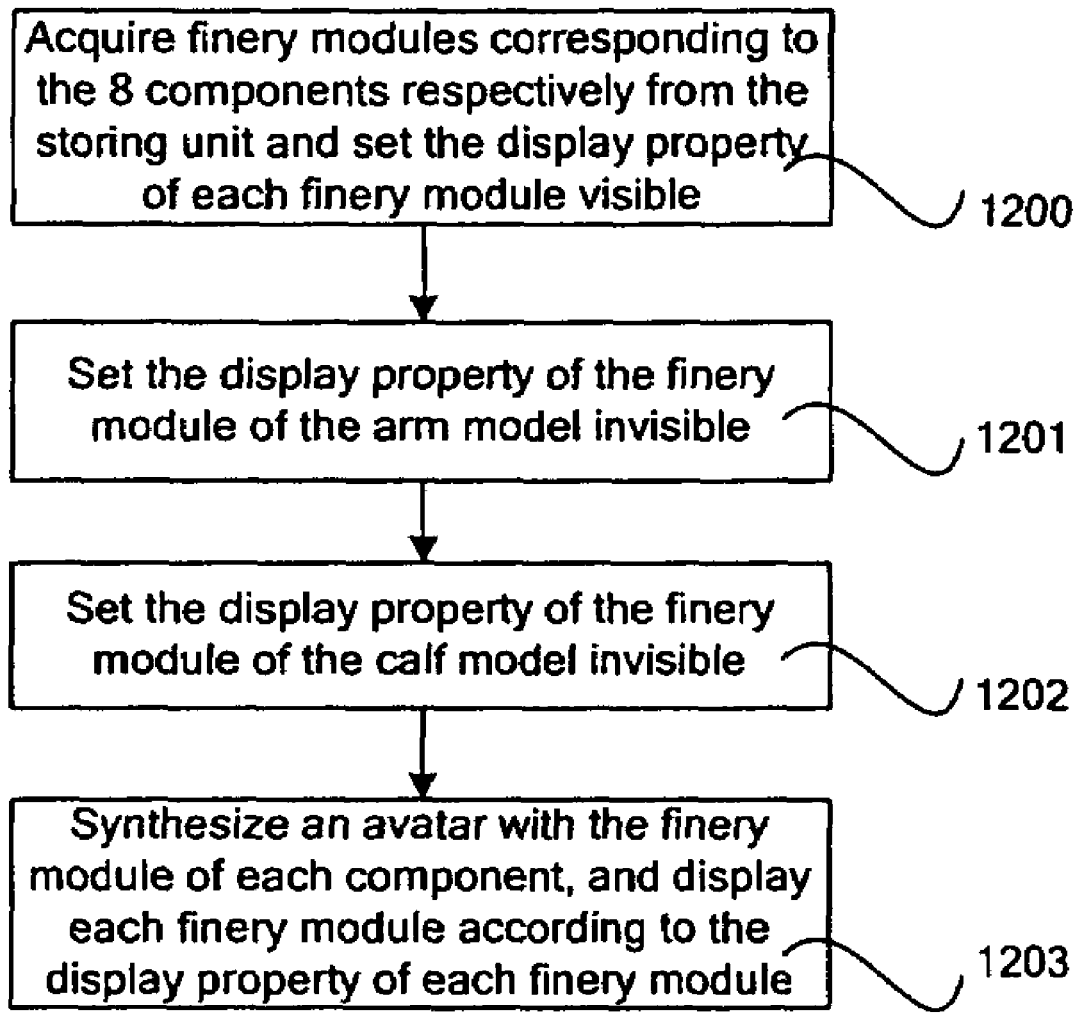
FIG. 20 shows a flow chart for displaying an avatar with finery modules of top-boot and trousers in lower part, and finery modules of gantlets and long-sleeved frock in upper part.

FIG. 20 shows a flow chart for displaying an avatar with finery modules of top-boot and trousers in lower part, and finery modules of gantlets and long-sleeved frock in upper part. As shown in FIG. 20, the process includes:

In Step 1200, the displaying unit 81 acquires the finery modules corresponding to the 8 components respectively from the storing unit 80, and sets the display property of each finery module visible. The finery module corresponding to the upper body model 32 is long-sleeved frock, the finery module corresponding to the hand model 34 and the arm model 33 is gantlets, the finery module corresponding to the lower body model 35 is trousers, and the finery module corresponding to the calf model 36 and the foot model 37 is tap-boot.

In Step 1201, the displaying unit 81 determines that module interpenetration occurs between the finery modules of the arm model 33 and the upper body model 32, and sets the display property of the gantlets finery module corresponding to the arm model 33 invisible.

In Step 1202, the displaying unit 81 determines that module interpenetration occurs between the finery modules of the calf model 36 and the lower body model 35, and sets the display property of the top-boot finery module corresponding to the calf model 36 invisible.

In Step 1203, synthesize an avatar with the finery modules corresponding to the 8 components, and display each finery module according to the display property of each finery module. Since the display property of the gantlets finery module corresponding to the arm model 33 and the top-boot finery module corresponding to the calf model 36 are invisible, module interpenetration is avoided in the displayed avatar.

To sum up, a calf model is divided from a personal model, and a top-boot finery module is composed of the finery modules corresponding to the calf model and the finery module corresponding to a foot model. When the finery modules of top-boot and trousers are displayed together, the finery module corresponding to the calf model is hidden, so the module interpenetration is avoided. While in other cases, the finery module corresponding to the calf model is displayed, i.e. is not hidden. Also, an arm model is divided from a personal model, and a gantlets finery module is composed of the finery module corresponding to a hand model and the finery module corresponding to the arm model. When the finery modules gantlets and long-sleeved frock are displayed together, the finery module corresponding to the arm model is hidden, so the module interpenetration is avoided. While in other cases, the finery module corresponding to the arm model is displayed, i.e. is not hidden.

With the above technical solutions, a 3-D avatar is displayed in an IM client, and the amount of the transmitted data is reduced by judging whether a 3-D avatar module needs to be updated. Also a 3-D avatar with stronger spatial sense and richer animation representation are provided. Furthermore, rich IM interaction is supported by representing an action and voice corresponding to an expression symbol in chat information. So, better interaction and representation for a high-end user are satisfied. Meanwhile, the problem of module interpenetration is also solved, so more living and better displaying effect of the avatar is attained.

The foregoing description is only preferred embodiments and is not for use in limiting the protection scope thereof. All the modifications, equivalent replacements and improvements in the scope of the present invention's spirit and principles shall be included in the protection scope.

The invention claimed is:

1. A method of displaying a 3-D avatar implemented by an instant messaging client, comprising:
    acquiring a 3-D avatar configuration file for a current user;
    acquiring at least one 3-D item suite indicated by the 3-D avatar configuration file, wherein the at least one 3-D item suite comprises at least a finery module;
    dividing a fundamental personal model into at least one component, wherein the at least one component comprises at least an arm model and a calf model;
    attaching location information to each component, wherein the location information indicates the location of the component in the fundamental personal model;
    binding the at least one 3-D item suite to the at least one component respectively based on the context of each 3-D item suite, wherein each 3-D item suite is set an identifier indicating the posture of the component after being bound to the 3-D item suite;
    determining whether module interpenetration occurs when binding a finery module to the arm model and/or a finery module to the calf model;
    setting the finery module corresponding to the arm model and/or the finery module corresponding to the calf model invisible if the module interpenetration occurs; and
    displaying the at least one 3-D item suite and the at least one component.

2. The method of claim 1, before acquiring the 3-D avatar configuration file and the at least one 3-D item suite indicated by the 3-D avatar configuration file, further comprising:
    judging that a 3-D avatar flag is set for the current user.

3. The method of claim 2, before acquiring the 3-D avatar configuration file and the at least one 3-D item suite indicated by the 3-D avatar configuration file, further comprising:
    updating the 3-D avatar configuration file and the at least one 3-D item suite based on a 3-D avatar update updating flag.

4. The method of claim 3, wherein the 3-D avatar updating flag is set based on a comparison result of the timestamp of the newest 3-D avatar configuration file in a 3-D avatar backstage sever with the timestamp of the 3-D avatar configuration file locally.

5. The method of claim 3, wherein updating the 3-D avatar configuration file comprises:
    requesting the 3-D avatar backstage server for downloading the newest 3-D avatar configuration file and storing the downloaded newest 3-D avatar configuration file locally.

6. The method of claim 5, wherein updating the at least one 3-D item suite comprises:
    requesting the 3-D avatar backstage server for downloading a 3-D item suite and storing the downloaded 3-D item suite locally, if the timestamp of the one 3-D item suite in a 3-D item suite list in the newest 3-D avatar configuration file is newer than the timestamp of the one 3-D item suite locally.

7. The method of claim 6, wherein the current user comprises a user logging in currently or a contract of the user logging in currently.

8. The method of claim 7, wherein the 3-D avatar flag is added in logging information of the user logging in currently, online friend information and user information of the user logging in currently, or in all of friend information acquired by the user logging in currently when re-running the register guide.

9. The method of claim 1, after displaying the at least one 3-D item suites, further comprising:
    determining whether an action/expression request message is to trigger a local 3-D avatar to represent an action; and
    acquiring the at least one action item suite corresponding to the action/expression.

10. The method of claim 9, wherein the action/expression request message comprises text information;
    acquiring the at least one action item suite corresponding to the action/expression comprises:
    acquiring the at least one action item suite corresponding to a common default expression / action configuration file via the 3-D avatar backstage server and storing the at least one action item suite locally.

11. The method of claim 9, wherein the action/expression request message comprises action button information;
    acquiring the at least one action item suite corresponding to the action/expression comprises:
    judging whether the at least one action item suite are to be updated or whether the at least one action item suite exist locally; and
    acquiring the newest action item suites from the 3-D avatar backstage server and updating the at least one action item suite and its timestamp stored locally if the at least one action item suite are to be updated or the at least one action item suite do not exist locally.

12. The method of claim 1,
    the at least one 3-D item suite further comprises any one or any combination of a hairstyle module, a shoe module and a ornament module.

13. The method of claim 1, wherein the at least one component further comprises a head model, an upper body model, a lower body model, a hand model and a foot model.

14. The method of claim 1, wherein the arm model locates between the locations of the cuff when the finery module of the upper body model is short-sleeved and the forearm in the hand model; the calf model locates between the upper knee and the location of the foot model.

15. The method of claim 1, wherein the at least one component further comprises a head model and a hair model.

16. An instant messaging client, comprising:
    a first unit, adapted to store a 3-D avatar configuration file for a current user;
    a second unit, adapted to store at least one 3-D item suite indicated by the 3-D avatar configuration file, the at least one 3-D item suite comprises at least a finery module;
    a third unit, connected to the first unit and the second unit, and adapted to acquire the at least one 3-D item suite indicated by the 3-D avatar configuration file and display the at least one 3-D item suite;
    wherein the third unit comprises,
        a first subunit, adapted to divide fundamental personal model of the 3-D avatar into at least one component, wherein the at least one component comprises at least an arm model and a calf model,
- a second subunit, connected to the first subunit, and adapted to (1) attach location information to each component, wherein the location information indicates the location of the component in the fundamental personal model, (2) bind the at least one 3-D item suite to the at least one component respectively based on the context of each 3-D item suite, wherein each 3-D item suite is set an identifier indicating the posture of the component after being bound to the 3-D item suite, (3) determine whether module interpenetration occurs when binding a finery module to the arm model and/or a finery module to the calf model, and (4) set the finery module corresponding to the arm model and/or the finery module corresponding to the calf model invisible if the module interpenetration occurs, and
- a third subunit, connected to the second subunit, adapted to display the at least one 3-D item suite and the at least one component.

17. The client of claim 16, further comprising:
a fourth unit, connected to the 3-D display engine, adapted to judge whether a 3-D avatar flag is set for the current user.

18. The client of claim 17, further comprising:
a fifth unit, adapted to compare the timestamp of the newest 3-D avatar configuration file in a server with the timestamp of the 3-D avatar configuration file in the first unit; and
a sixth unit, connected to the fifth unit and the first unit, adapted to request the server for downloading the newest 3-D avatar configuration file based on the comparison result of the fifth unit and store the downloaded 3-D avatar configuration file in the first unit.

19. The client of claim 18, further comprising:
a seventh unit, connected to the fifth unit, adapted to set the 3-D avatar updating flag for the current user based on the comparison result of the fifth unit.

20. The client of claim 19, further comprising:
an eighth unit, connected to the first unit, adapted to compare the timestamp of a 3-D item suite in a 3-D item suite list in the newest 3-D avatar configuration file with the timestamp of the 3-D item suite in the second unit;
a ninth unit, connected to the eighth unit and the seventh unit, and adapted to request the server for downloading the 3-D item suite based on the 3-D avatar updating flag and the comparison result of the eighth unit; and
a tenth unit, adapted to receive the 3-D item suite from the server and store the 3-D item suite in the second unit.

21. The client of claim 20, further comprising:
an eleventh unit, connected to the third unit, adapted to judge whether an action/expression request message is to trigger a local 3-D avatar to represent a corresponding action and notify the third unit to display the corresponding action if the action/expression request message is to trigger a local 3-D avatar to represent the action; and an twelfth unit, connected to the eleventh unit and the second unit, adapted to analyze the action/expression request message, receive at least one action item suite corresponding to the action/expression request message from the server, and store the at least one action item suit in the second unit.

22. A system of displaying a 3-D avatar, comprising:
a server, adapted to provide a 3-D avatar configuration file and at least one 3-D item suite for an instant messaging client;
the instant messaging client, adapted to (1) store a 3-D avatar configuration file for a current user, (2) store at least one 3-D item suite indicated by the 3-D avatar configuration file, where the at least one 3-D item suite comprises at least a finery module, (3) divide fundamental personal model of the 3-D avatar into at least one component, wherein the at least one component comprises at least an arm model and a calf model; (4) attach location information to each component, wherein the location information indicates the location of the component in the fundamental personal model; (5) bind the at least one 3-D item suite to the at least one component respectively based on the context of each 3-D item suite, wherein each 3-D item suite is set an identifier indicating the posture of the component after being bound to the 3-D item suite; (6) determine whether module interpenetration occurs when binding a finery module to the arm model and/or a finery module to the calf model; set the finery module corresponding to the arm model and/or the finery module corresponding to the calf model invisible if the module interpenetration occurs; and (7) display the at least one 3-D item suite and the at least one component.

23. The system of claim 22, wherein the server comprises:
a first unit, adapted to store a 3-D avatar configuration file and at least one 3-D item suite and
a second unit, connected to the first unit, adapted to send the 3-D avatar configuration file and the at least one 3-D item suite to the instant messaging client.

24. The system of claim 23, wherein the instant messaging client comprises;
a third unit, adapted to store a 3-D avatar configuration file for a current user;
a fourth unit, adapted to store at least one 3-D item suite; and
a fifth unit, connected to the third unit and the fourth unit, and adapted to acquire at least one 3-D item suite indicated by the 3-D avatar configuration file and display the at least one 3-D item suite.

25. The system of claim 24, wherein the server further comprises
a sixth unit, adapted to set a 3-D avatar flag for a current user; and
wherein the instant messaging client further comprises
a seventh unit, connected to the 3-D display engine, adapted to judge whether a 3-D avatar flag is set for the current user.

* * * * *